Patented Sept. 11, 1951

2,567,778

UNITED STATES PATENT OFFICE 2,567,778

BASIC ETHERS OF XYLENOLS

Albert M. Mattocks, Cleveland, Ohio, assignor to Bristol Laboratories, Inc., Syracuse, N. Y., a corporation of New York No Drawing. Application March 31, 1949,
Serial No. 84,729

6 Claims. (Cl. 260—247.7)

This invention relates to amino ethers of xylenols and their acid addition salts and to methods for obtaining these compounds. More specifically, the invention relates to basically di-substituted xylenol ethers and their acid addition salts. The free bases of the basically di-substituted xylenol ethers of the invention have the formula,

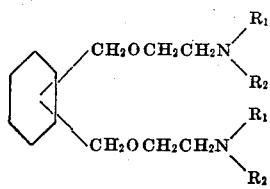

where $R_1$ and $R_2$ represent the same or different lower alkyl radicals which may be joined to form piperidine or which may contain an oxygen ether linkage and be joined to form morpholine. These compounds may be obtained as a free base having the formula given above or as acid addition salts of the base with inorganic acids; such as, for example, hydrochloric acid and the like.

The bis(dialkylaminoethoxymethyl) benzenes of the present invention may be prepared by treating dialkylaminoethanols with metallic sodium to form the corresponding sodium alcoholate. The sodium alcoholate is then reacted with a xylene dibromide to form the bis(dialkylaminoethoxymethyl) benzene which is isolated by fractional distillation. For example, two gram-atoms of sodium were added to two and one-half moles of dialkylaminoalkanol in an equal volume of toluene and the mixture was heated with vigorous stirring until all of the sodium dissolved. One mole of ortho- or para-xylene dibromide was added while keeping the solution at 20° C. or below. After complete addition of the xylene dibromide, the mixture was heated at 100° C. for one hour and then cooled to room temperature. Cold water was added and the mixture extracted with ether. The ethereal layer was acidified and extracted with water; and the acidic solution was filtered, made basic, and extracted with ether. The dried ethereal extract was fractionally distilled. The hydrochloride acid addition salts of the amino ethers were obtained by treating the free bases with alcoholic hydrogen chloride and recrystallizing the products from absolute ethanol or isopropanol.

The free bases and the acid addition salts of the bis(dialkylaminoethoxymethyl) benzenes are active as local anesthetics. Many of these compounds possess higher local anesthetic activity than cocaine or are less toxic than cocaine. In the ortho xylene series, particularly, increased intradermal activity is generally accompanied by less than proportionally increased toxicity. The 1,2-bis(diethylaminoethoxymethyl) benzene, for example, possesses higher activity as a local anesthetic and lower toxicity than cocaine.

The invention is illustrated by the following examples:

*Example 1.—1,2-bis(diethylaminoethoxymethyl) benzene*

26.6 g. (0.218 mole) of diethylaminoethanol is added to a solution of 5.24 g. (0.228 mole) of sodium in 100 cc. of methyl alcohol. Toluene is added and the mixture distilled to remove the methanol and most of the toluene. To the sodium salt of aminoethanol thus obtained, 200 cc. of the toluene containing 60 g. (0.227 mole) of o-xylene dibromide is added. The mixture is allowed to stand for one hour and is then refluxed for two hours. Another equivalent of diethylaminoethanol is added and refluxing continued for another four hours. At the end of the reaction a clear yellow toluene solution stands above a grainy white to pale yellow precipitate. The toluene solution is removed and the toluene is distilled off therefrom. The residue obtained is dissolved in butanol-water and the water layer separated. The butanol layer is dried over NaOH and the solvent distilled off. The residue is distilled and a yellow oil obtained which boils between 100–140° C. at .1 mm. This is redistilled and fractionated at 0.05 mm.—through a Vigneaux column to yield 4.3 g. of a fraction (A) boiling at 155° C.

53.2 g. (0.454 mole) of diethylaminoethanol is added to 10.5 g. (0.454 mole) of powdered sodium in 200 cc. of toluene. After the reaction is complete the mixture is added to 60 g. (0.227 mole) o-xylene dibromide with stirring and cooling. When the addition is completed the mixture is refluxed for four hours. The mixture is then poured into dilute HCl and the organic layer is removed. The aqueous extract is made basic with NaOH and extracted with ether. This is dried and distilled to yield 20 g. of a fraction (B) of yellow oil boiling between 163–170° C., at 0.7 mm.

The reaction immediately above is repeated employing 57 g. of o-xylene dibromide which produces a yield of 15 g. of a fraction (C) of a yellow oil.

The fractions A, B and C are combined and redistilled at 0.02 mm. through a Vigneaux column to yield 31.2 g. of 1,2-bis(diethylaminoethoxymethyl) benzene boiling between 150–160° C. at 0.02 mm.

*Example 2.—1,2-bis(piperidinoethoxymethyl) benzene*

12.7 g. (0.55 mole) of sodium is dissolved in 71.5 g. (0.55 mole) of piperidinoethanol and an excess of 9 g. of piperidinoethanol is added. The solution is cooled in a cold water bath and 100 cc. of toluene and 50 g. (0.27 mole) o-xylene dibromide added in from 1 to 2 g. portions with stirring. After the addition is completed stirring is continued at 20–25° C. for one hour. The mixture is then heated 100° C. for two hours. 29 g. (0.27 mole) of $Na_2CO_3$ is added and the heating at 100° C. continued with stirring for three hours after which the mixture is allowed to stand at room temperature overnight. The mixture is poured into water, extracted with ether and then distilled. A yield of 60.5 g. of a yellow oil is obtained having a boiling range of 160–164° C. at 0.8 mm. This product is redistilled through a Vigneaux column at 5.5 mm. to yield 27.5 g. of a fraction boiling between 208–210° C. This fraction is dissolved in ether and extracted with 15% HCl. The ether extract is discarded and the aqueous portion made basic and the product extracted with ether and then distilled. A yield of 13 g. of 1,2-bis(piperidinoethoxymethyl) benzene boiling between 212–214° C. at 0.6 mm. is obtained.

*Example 3.—1,2-bis(morpholinoethoxymethyl) benzene*

The procedure in Example 2 above is followed employing 10 g. of sodium and 60 cc. of morpholinoethanol to produce the sodium alcoholate. The latter is reacted with 53.5 g. (0.202 mole) of o-xylene dibromide. A yield of 37 g. of 1,2-bis(morpholinoethoxymethyl) benzene boiling between 220–230° C. at 1–2 mm. is obtained.

*Example 4.—1,4-bis(piperidinoethoxymethyl) benzene*

The procedure in Example 2 above is followed employing 10 g. of sodium and 60 cc. of piperidinoethanol to produce the sodium alcoholate. This is reacted with 53 g. of p-xylene dibromide to yield 54 g. of the free base 1,4-bis(piperidinoethoxymethyl) benzene boiling between 180–190° C. at 0.1 mm. The product is treated with a slight excess of alcoholic HCl and cooled. Colorless crystals form which are filtered out and dried in a desiccator and then in an oven. A yield of 18 g. of the dihydrochloride acid addition salt of the free base having a melting point of 205–206° C. is obtained.

Some further examples of the compounds of the invention which can be prepared by the above described methods are 1,2-bis(dimethylaminoethoxymethyl) benzene, 1,4-bis(diethylaminoethoxymethyl) benzene, 1,4-bis(dimethylaminoethoxymethyl) benzene and 1,4-bis(morpholinoethoxymethyl) benzene.

I claim:

1. A compound of the class consisting of the bis form of the free base and its acid addition salts, said free base having the general formula

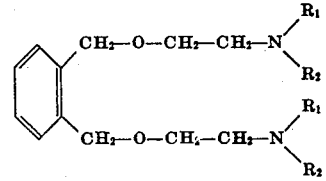

wherein $R_1$ and $R_2$ are selected from the class consisting of alkyl having 1 to 2 carbon atoms inclusive, and where taken together with the nitrogen atom are morpholino and piperidino.

2. 1,2-bis(diethylaminoethoxymethyl) benzene.
3. 1,2-bis(piperidinoethoxymethyl) benzene.
4. 1,2-bis(morpholinoethoxymethyl) benzene.
5. An acid addition salt of 1,2-bis(diethylaminoethoxymethyl) benzene.
6. An acid addition salt of 1,2-bis(piperidinoethoxymethyl) benzene.

ALBERT M. MATTOCKS.

REFERENCES CITED

The following references are of record in the file of this patent:

UNITED STATES PATENTS

| Number | Name | Date |
|---|---|---|
| 2,287,464 | Bock | June 23, 1942 |
| 2,287,465 | Bock | June 23, 1942 |
| 2,316,625 | Rothenberger | Apr. 13, 1943 |

FOREIGN PATENTS

| Number | Country | Date |
|---|---|---|
| 193,618 | Great Britain | Jan. 19, 1922 |

OTHER REFERENCES

Mason et al.: "J. Am. Chem. Soc.," vol. 62, 1450–1452 (1940).

Lee et al.: "J. Org. Chem.," vol. 12, 885–893 (1947).